United States Patent [19]

Rosenstingl

[11] 3,715,584
[45] Feb. 6, 1973

[54] METHOD AND APPARATUS FOR EVALUATING THE DEGREE OF QUENCHING IN SCINTILLATION SPECTROMETRY

[75] Inventor: Emmanuel Rosenstingl, Plaisir, France

[73] Assignee: Intertechnique S.A., Plaisir, France

[22] Filed: Nov. 17, 1970

[21] Appl. No.: 90,362

[30] Foreign Application Priority Data

Nov. 21, 1969 France..............................6940184
Oct. 29, 1970 France..............................7039133

[52] U.S. Cl......250/71.5 R, 250/83.3 R, 250/106 SC
[51] Int. Cl................................................G01t 1/20
[58] Field of Search........250/106 SC, 71.5 R, 83.3 R

[56] References Cited

UNITED STATES PATENTS 3,610,928 10/1971 Thomas.........................250/106 SC Primary Examiner—Archie R. Borchelt
Attorney—Lane, Aitken, Dunner & Ziems

[57] ABSTRACT

For evaluating the degree of quenching in a liquid scintillation sample, the pulse height corresponding to the centroid of part at least of the net count rate — pulse height spectrum due to a radioisotope in the sample or to an external standard is determined and compared with a calibration curve. Provision is made for subtraction of the contribution of the background noise. Determination of the counting efficiency is made by interpolation on a calibration curve.

20 Claims, 8 Drawing Figures

METHOD AND APPARATUS FOR EVALUATING THE DEGREE OF QUENCHING IN SCINTILLATION SPECTROMETRY

BACKGROUND OF THE INVENTION

This invention relates to a method and device for scintillation spectrometry and more particularly liquid scintillation spectrometry. One of the major problems which affects the accuracy in liquid scintillation spectrometry is the variation in counting efficiency which occurs when changing from one sample under analysis to another. Different factors tend to impair this efficiency which must be known in order that the number of disintegrations which have taken place in the samples may be deduced from the number of pulses or counts which are delivered by transducers in response to radiations from said samples. Probably the most important of these factors is sample "quenching."

There are already many existing methods for evaluating the degree of quenching and the resulting reduction in counting efficiency E. Some of these methods involve modifying at least one of the operating parameters of the spectrometer in order to bring the degree of quenching back to a predetermined value (which can be the same for all samples or which can be the nearest value among a plurality of predetermined values. Most of the methods for evaluating the degree of quenching are based on the following principle : the relation between the counting efficiency E and a quenching correlation parameter $r$ is determined, the parameter $r$ being such as to be readily determined for each sample. This relation first is determined point by point by employing a finite number of reference or standard samples of known activity. Once the relation is known, the parameter $r$ is measured in the case of each sample and the efficiency E is deduced therefrom.

In most cases, the correlation parameter $r$ is such that its relation with the counting efficiency E is due to the phenomenon of spectral shift caused by quenching : the curve plotting the count rate as a function of the energy of pulses detected by photomultipliers shifts towards the low energies when quenching is present. The observed spectrum can be that the counted isotope itself or of another isotope of the same sample (channels ratio method). Alternatively, the shift can be that of the Compton edge which is induced by an external gamma standard (methods of external standardization or external standard channels ratio). However, the correlation between the channels ratio and the degree of quenching is unsufficiently accurate in a number of cases ; as to the two last named methods, they make it necessary that two counts at least be carried out on each sample ; the count rate induced by the external standard is volume dependent and the correlation curve has a complex shape with strong variations of curvature which have an adverse effect on ease of operation and accuracy of the computation.

It is an object of the invention to provide another correlating parameter which provides satisfactorily accurate correlation with the degree of quenching substantially under all conditions of use.

It is another object of the invention to develop a method and apparatus which provides correlation more accurate that that of the channels ratio method.

It is another object of the invention to develop a method and apparatus for evaluation of the degree of quenching wherein the correlation between the degree of quenching and a correlating parameter easy to determine may be represented by a curve with small curvatures only, thereby improving over the above three methods.

It is an ancillary object of the invention to provide a method and apparatus wherein all data necessary for determination of the desintegration rate in a sample are collected during the same counting period.

SUMMARY OF THE INVENTION

The above and other objects of the invention are attained by using a correlation parameter consisting of the pulse height corresponding to the centroid of that portion of the count rate — pulse height spectrum which is in a predetermined amplitude range. As usual, the word "centroid" designates the center of gravity of the area which is bordered by the pulse height axis, the straight lines parallel to the count rate axis and which correspond to the pulse height limits, and the portion of the curve which is between the two limits. The spectrum may be that of the radioisotope or of one of the radioisotopes in double-labelled samples (preferably then that of the higher energy isotope). It may also be the spectrum induced by a radioactive standard source. In the case of single-labelled samples, it may prove advantageous to make use of the entire spectrum of the radioisotope in the sample and in the case of double-labelled samples it will be preferable to make use of that portion of the spectrum which is located above the range corresponding to the lower energy radioisotope. In the case of mixed samples two amplitude ranges and two sets of calibration curves will alternately be used, depending on the particular radioisotope present in each sample.

At this stage it may be useful to remind that, in practice, the spectrum which is the most readily available is not usually the light-pulse spectrum itself but the spectrum of the electrical pulses supplied by a transducer system (photomultiplier tube and amplifier for instance) which is subjected to the action of the light scintillations or flashes. Thus, if the amplitude or height of the electrical pulses supplied by a transducer system of this type is proportional to the energy of the pulses of light, that is to say to the number of photons which constitute the scintillation, the correlation parameter $r$ represents the average number of photons per event and is therefore proportional to the quantum efficiency of the scintillator (number of photons per keV). If the proportionality is not maintained and this is the case especially when the amplifier means have a logarithmic response, the above concept loses its significance and the correlation parameter then represents only the mean height of the electrical pulses which are delivered by the transducer system. However, the centroid position continues to be characteristic of the degree of quenching and of the counting efficiency.

When the value of the correlation parameter has been determined, the count rate is corrected for compensation of the degree of quenching. The word "correction" should obviously be construed as covering a number of possibilities, particularly (i) computing the counting efficiency from the value of the parameter $r$ and (ii) manually or automatically adjusting one parameter at least of the spectrometer at a value depending on the value of $r$ for the activity of all single-labelled samples to be measured with the same counting efficiency.

By way of example, either of the following operations can be carried out after determination of the value of $r$:
- plotting the value of $r$ on a curve which has previously been drawn to determine the efficiency E;
- automatically computing E from $r$ by means of a computer if the relation between the counting efficiency E and the parameter $r$ has been stored in the form of constant coefficients of a polynomial relation; U. S. Thomas
- adjusting one at least of the operating parameters of the spectrometer (such as the high voltage applied to the photo-pultipliers and the gain of the amplifiers) in order to bring back E to a predetermined value which can be the same for all the samples or the nearest value of a series of predetermined values each corresponding to a known value of the efficiency E; simultaneously with the gain or high voltage, it is possible to modify other operating parameters of the spectrometer according to another predetermined criterion: for example, the limits of the energy "windows" can be modified in order to optimize the figure of merit as disclosed in U.S. Pat. application, Ser. No. 862,891 in the name of Edward W. Thomas

BRIEF DESCRIPTION OF THE DRAWINGS

The invention will be better understood from the following description of embodiments of the invention given by way of examples. The description refers to the accompanying drawings, wherein.

DESCRIPTION OF EMBODIMENTS

Figure 1:
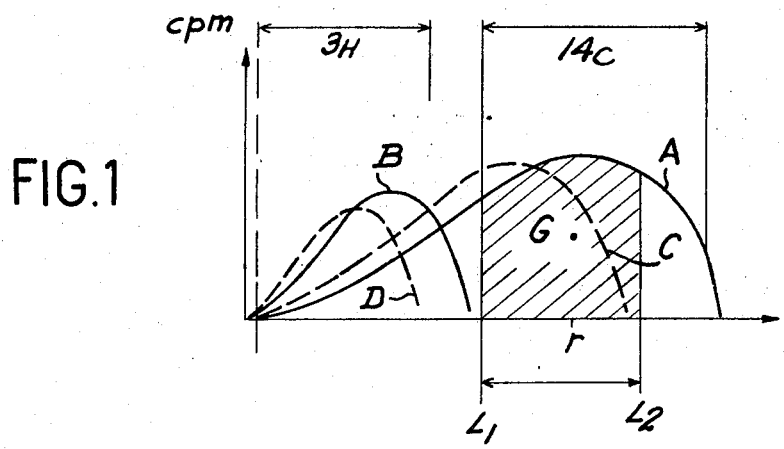
FIG. 1 illustrates a pulse height histogram produced by the two radioisotopes in a double-labelled liquid scintillation test sample.

The principle of the invention and the advantage thereof will be more apparent from a consideration of FIG. 1. The curves A and B shown in full lines in FIG. 1 represent on the same scale the histogram of the electrical pulse heights at the output of a transducer system which is subjected to the action of an unquenched sample containing a single isotope of average energy such as carbon-14 (curve A) and the histogram under the same conditions of an isotope which emits soft beta radiations such as tritium (curve B). Each point of a curve gives the rate of occurrence of pulses having a height located within a narrow and predetermined range of amplitude on each side of the pulse height which corresponds to the abscissa of the point. Pulse heights in FIG. 1 are presented on a logarithmic scale but similar curves could be plotted on a proportional scale.

Curves C and D which are shown as dashed lines represent the pulse height histograms corresponding to the curves A and B but in a sample which exhibits a degree of quenching. FIG. 1 shows that quenching results in deformation of the curves which consequently contract or shift towards the low pulse heights and simultaneously flatten downwardly. As already mentioned, attempts have already been made to derive advantage from the shift of the maximum value towards low energies in order to determine the degree of quenching by making use of the so-called "channels ratio" method: The accuracy achieved by this method is relatively low but still remains acceptable in the case of samples which are single-labelled with a high energy radioisotope. But the method is of no practical use in the case of samples which are single-labelled with tritium and in the case of double-labelled samples.

According to the invention, as illustrated on FIG. 1, the correlation parameter $r$ is constituted by the abscissa of the center of gravity or centroid G of the amplitude spectrum of the radioisotope contained in the sample (single-labelled sample) or of that of the isotopes contained in the sample which has the highest energy, either wholly or in that portion which is located within a predetermined pulse height "window" which is the same for all the test samples. FIG. 1 shows a pulse height window $L_1-L_2$ which may be selected in the case of samples labelled with two isotopes ($^3H$ and $^{14}C$, for example).

More specifically, if $u$ designates the quantity which is plotted as abscissae (pulse height, energy corresponding to the pulses or logarithm of either one or the other) and $c = f(u)$ designates the count rate corresponding to $u$, then the position $r$ of the centroid G of that portion of the spectrum which is located between the limits $L_1$ and $L_2$ is given by the relation:

$$r = \frac{\int_{L_1}^{L_2} u \cdot f(u) \cdot du}{\int_{L_1}^{L_2} f(u) \cdot du} \quad (1)$$

It must be noted in this case that, while the function $f(u)$ represents the count rate as a function of the pulse height, $r$ represents the mean height of that portion of the spectrum which is located within the window $L_1 - L_2$. If the pulse height is proportional to the number of photons produced as a result of the corresponding disintegration, $r$ accordingly represents the mean number of photons per decay event. In the case of a logarithmic amplification spectrometer, this physical definition no longer holds but the correlation between $r$ and the counting efficiency nevertheless remains satisfactory.

The function $f(u)$ may be available only in the form of $n$ samples, that is to say of $n$ values $N_1, N_2, \ldots, N_i, \ldots, N_n$ of the count rate corresponding to values $u_1, u_2, \ldots,$ $u_n$ of the pulse height, in which case the formula (1) becomes:

$$r = \sum_{1}^{n} u_i \cdot N_i \Big/ \sum_{1}^{n} N_i \qquad (2)$$

Figure 2:
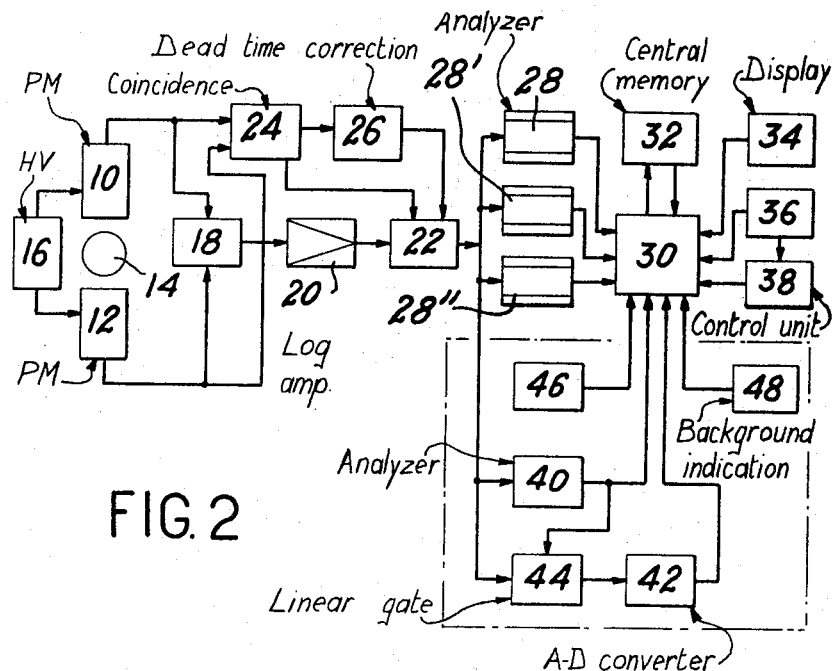
FIG. 2 is a simplified block diagram of a liquid scintillation spectrometer illustrating the present invention.

FIG. 2 represents a liquid scintillation spectrometer which is designed to carry out the method discussed in the foregoing. Part of this spectrometer may be of a type old in the art, for instance as described in U.S. Pat. application, Ser. No. 778,057 assigned to the assignee of the present invention or as in the apparatus which is marketed by the assignee under the commercial designation ABAC SL 40. This conventional part comprises two photomultiplier tubes 10 and 12 located on each side of a counting station 14 to which the samples to be analyzed are brought successively. The photomultipliers are supplied from a high voltage source 16. The output pulses delivered by said photomultipliers are added in a summing circuit 18 which drives a logarithmic amplifier 20. The output signals of the amplifier 20 are applied to the input of a linear background-elimination gate 22 controlled by a coincidence circuit 24 to which the output pulses of the photomultipliers 10 and 12 are applied. A dead-time correction circuit 26 serves to take into account the recovery time of the electronic circuitry.

The amplified signals which appear at the output of the linear gate 22 are applied to selection channels which are placed in parallel, provision being made for three channels in the example which is illustrated. Pulse height analyzers 28, 28' and 28'' each incorporate two adjustable discriminators which permit the selection of windows corresponding to different radioisotopes. Only the pulses having a height which is within the window of an analyzer are passed to the arithmetic unit 30 of a digital computer which is equipped with a central store system or memory 32. Input and output peripheral units are associated with the arithmetic unit and comprise, for example, a display unit 34, a teletype 36 and a control unit 38 for feeding data into the computer by means of the keyboard of the teletype.

A sub-assembly for determination of the position of the centroid is associated with the above components and is shown in block diagram within the chain-dotted frame of FIG. 2. It will be referred to hereinafter as a "calibration assembly" and comprises an additional pulse height analyzer 40 provided with two discriminators which serve to define the calibration window, designated in FIG. 1 by the reference $L_1-L_2$. Pulse height analyzer 40 makes it possible for a counter in the arithmetic unit 30 to record the number of pulses within the window $L_1-L_2$ during a predetermined counting time which can be identical with the time during which the pulses passed by the analyzers 28, 28' and 28'' are counted. The counter will therefore record the term $\Sigma N_i$ of the formula (2) given above.

The output pulses of the linear gate 22 are also applied to an analog-to-digital converter 42 (of the Wilkinson type, for example) via a second linear gate 44. The control input of the linear gate 44 is coupled with the output of the amplitude selector 40, with the result that only those pulses which fall within the window $L_1-L_2$ are applied to the converter. Each time the converter receives a pulse, it delivers to a second counter of the computer a number of bits which is proportional to the pulse height. At the end of the counting time, the computer therefore has available in digital form the total number of pulses within the window $L_1-L_2$ and the cumulated amplitude of said pulses, that is to say respectively the denominator and the numerator of the formula (2) for the determination of $r$.

However, the data which are thus supplied include counts due to background. At least in the case of low activity test samples, the presence of the background count could make the value of $r$ lose all its significance but it is a relatively simple matter to convert observed indications to true indications; it is usually only necessary to display manually, by adjustment of switches 46 and 48 respectively, the count rate corresponding to the background and the corresponding mean pulse height. The switches control generators (not shown). This solution gives satisfactory results since the variation in background with the quenching value is relatively small inasmuch as the proportion of background which is subjected to quenching exceeds 20 percent only in exceptional cases. The values which are indicated by means of the manual switches 40 and 48 can be determined experimentally once and for all by making use of an unlabelled reference sample and the different counting windows which may be employed for determining the parameter $r$.

In order to determine the value of $r$, the computer is only required to calculate the difference between the data supplied by the converter 42 and the generator actuated by switch 48 as well as the difference between the data supplied by the analyzer 40 and the switch 46 and to establish a division between the two results. These calculations can be performed in a wholly conventional manner and need not therefore be described here.

The analog-to-digital converter 42 can be of conventional design. The converter can also consist of an ancillary apparatus which can be employed independently of the spectrometer: for example, it is possible to employ a multi-channel analyzer of the DIDAC type developed by the assignee of the present invention. In order to ensure a sufficient degree of accuracy in locating the position of the centroid, the converter must have a digital output having at least five binary digits: A 100-channel analyzer is usually sufficient for this purpose. When the lower limit $L_1$ of the calibration window is not placed at the beginning of the spectrum (which is the case illustrated in FIG. 1), it is preferable to use the analyzer by performing a subtraction of zero channel, that is to say by carrying out the selection with a channel 1 which corresponds not to the amplitude 0 (which would result in loss of accuracy) but to the amplitude $L_1$. Postulating that $r$ is equal to the mean value of $L_1$ and $L_2$ and that the interval between the origin and $L_1$ is equal to $L_1 - L_2$, it is apparent that the limits are in a ratio of 1:2 in the case of conventional use of the selector whereas the ratio is 0:1 in the case of subtraction of zero channel, thereby resulting in greater relative divergences and a higher degree of accuracy in the determination of $r$.

The device which has just been described makes it possible to determine the value of the parameter $r$ in respect of any sample which is placed opposite to the photomultipliers 10 and 12. In order that the counting efficiency E may be obtained from $r$ in the case of an unknown sample, it is clearly necessary to ensure that the relation which exists between said efficiency and the parameter $r$ is determined beforehand. This determination can be performed in a conventional manner by making use of a series of samples having a known value of activity as will become apparent hereinafter.

Figure 3:
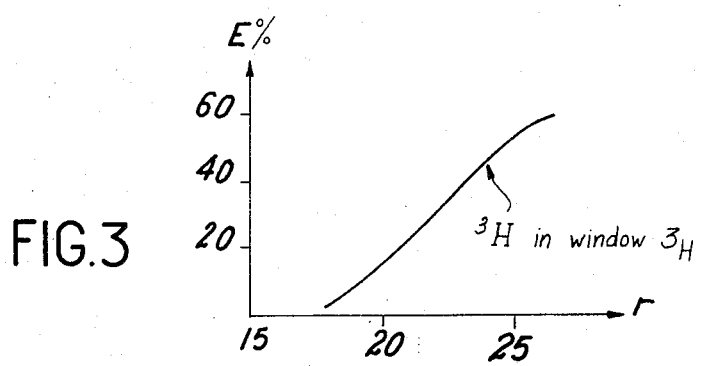
FIGS. 3 and 4 are typical calibration curves for carbon-14 and tritium, respectively.
Figure 4:
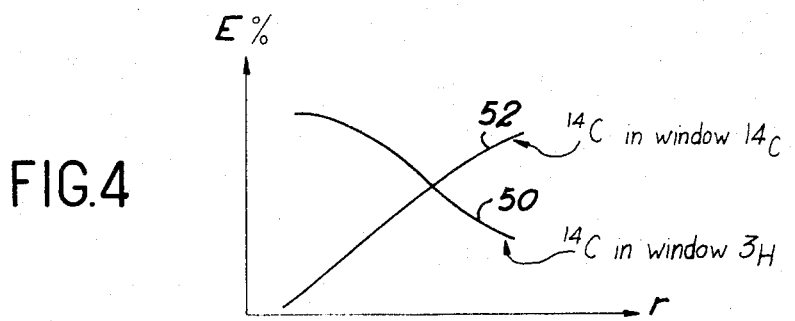

The general shape of the curves which are representative of the variations is given in FIG. 3 in the case of tritium and in FIG. 4 in the case of carbon-14. The curve 50 in FIG. 4 designates the counting efficiency for carbon in its own window whilst the curve 52 designates the counting efficiency for carbon-14 in the tritium window. It is observed that the curves are much flatter than when $r$ is constituted by the count rate induced by an external standard.

It must also be pointed out that the calibration assembly which has just been described can be adapted without any extensive modification to liquid scintillation spectrometers of the types at present in use. The calibration assembly can be designed in the form of an adaptable unit which is supplied together with the corresponding programs for the computer 30 in the case of spectrometers which are equipped with a computer of this type.

The mode of operation of the calibration assembly will now be described very briefly in the case of double labelled samples tagged with carbon-14 and tritium (case of FIG. 1). In a first step, three calibration curves are prepared:

counting efficiency $E_{CC}$ for carbon-14 in its own counting window (labelled $14_c$ in FIG. 1) as a function of $r$, position of centroid in window $L_1-L_2$;

counting efficiency $E_{CH}$ for carbon-14 in the tritium counting window (labelled $3_H$ in FIG. 1) as a function of $r$ (this curve being necessary in order to determine the contribution of carbon-14 in the tritium window);

counting efficiency $E_{HH}$ for tritium in its own counting window (labelled $3_H$ in FIG. 1) as a function of $r$.

The first two curves are prepared by employing a set of reference samples labelled with carbon-14, said samples having known activities and different quenching values. The third curve is prepared by employing a set of double-labelled reference samples each containing a known activity of carbon-14 and a known activity of tritium. The efficiency $E_{HH}$ is obtained in the case of each sample:

by determining the count rate in the window $3_H$;

by computing the count rate which corresponds to the contribution of carbon-14, as performed by multiplying the desintegration rate (this being known since the carbon activity of the sample is also known) by the counting efficiency $E_{CH}$;

by subtracting the two above mentioned values;

by dividing the result by the disintegration rate of tritium which is known inasmuch as the $^3H$ activity of the sample is known.

It it thus possible to plot the curve of FIG. 3.

Once the curves have been determined, the counting efficiency E of each further sample under analysis which is brought to the counting station is measured in a simple manner since there is only one count in respect of each sample. It is only in the case in which it is desired to modify at least one of the operating parameters of the liquid scintillation spectrometer in order to satisfy a particular criterion (predetermined quenching value, constant figure of merit $E^2/B$, constant contribution and so forth) that two successive counts are necessary.

Figure 5:
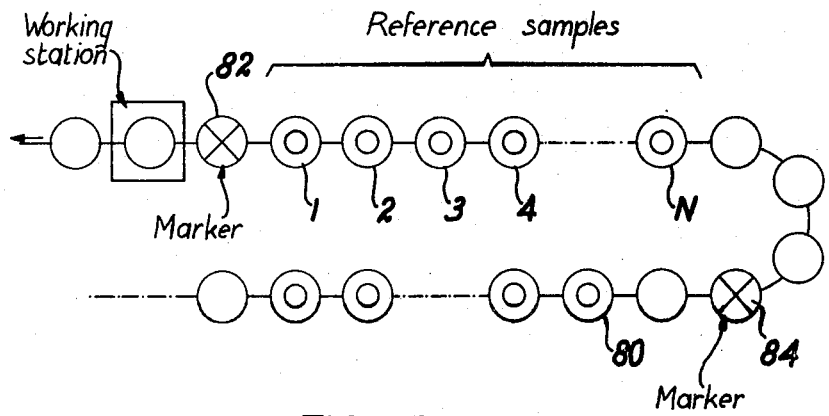
FIG. 5 is a schematic representation of the conveyor of the spectrometer of FIG. 2, in which N successive links locate reference samples and precede links locating a batch of single-labelled test samples.
Figure 6:
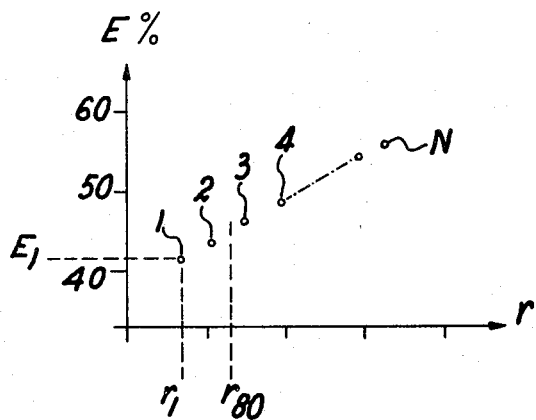
FIG. 6 is a graphical representation of correlation parameter $r$ and counting efficiency E for the N reference samples of FIG. 5.

In the arrangement of FIG. 5, N reference samples ($N = 10$) designated by the numbers 1, 2, 3, ... N are located in N successive links of the conveyor and exhibit increasing counting efficiencies E and increasing values of $r$; the samples are so selected the range of variation of their efficiencies exceeds that of the test samples to be analyzed. The test samples constitute a second batch located in seriatim order in the conveyor: the first test sample only is illustrated at 80 in FIG. 5. Two plug markers are located in links 82 and 84 in front of the reference samples and of the test samples, respectively. The sequences of operations are then as follows, described in a simplified way:

1. — Determination of N points of the calibration curve (E versus $r$)
    a. The activities of the single labelled reference samples ($^{14}C$ labelled samples) are entered into the central memory using the teletype keyboard.
    b. The marker in link 82 comes first to a working station; detection means which can be of the type disclosed and claimed in U.S. Pat. application, Ser. No. 788,057 causes a standardization computer program to be transferred from an auxiliary memory (punched tape of teletype 36 for instance) to the central memory 32 of the computer. The computer then automatically sets the windows of analyzers 28 and 40 at the proper values. For instance the discriminators of two analyzers 28 are respectively set for encompass the windows $3_H$ and $14_C$ of FIG. 1, while those of analyzer 40 are set for limiting window $L_1-L_{2a}$.
    c. The first reference sample 1 then comes to the working station; the sample changer, which may be of the type disclosed and claimed in U.S. Ser. No. 716,213 assigned to the assignee of the present invention, moves it to counting station 14, between photomultiplier tubes 10 and 12.
    d. A counting operation takes place and the results are fed to computer 30 which determines the values $r_1$ and $E_1$ of parameter $r$ and efficiency E for reference sample 1; values $r_1$ and $E_1$ are stored.
    e. Operations c and d are repeated for each reference samples: as a consequence, a calibration curve (counting efficiency of $^{14}C$ in window $14_C$ versus $r$ in window $L_1-L_2$ is stored in the form illustrated in FIG. 6: The points 1, 2, 3, ... . N in FIG. 6 correspond to samples 1, 2, 3, ... N.

Figure 7:
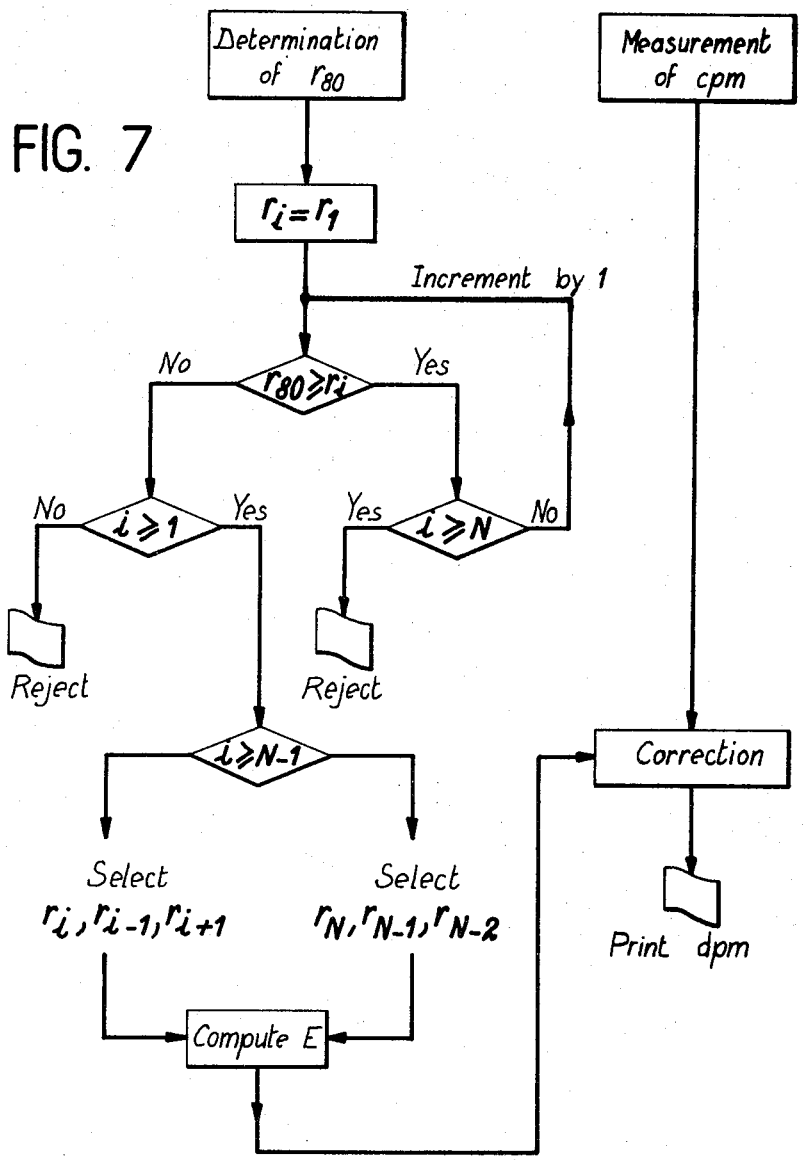
FIG. 7 is a schematic representation of a program used for computing the efficiency for each test sample E by an interpolation technique.

2. Determination of activity of test samples labelled with carbon 14.
    a. The conveyor brings the link 84 locating a second marker to the working station which precedes a batch of test samples: The marker enters a program from the auxiliary memory (punched tape of teletype 36) while the calibration program is erased.

b. The first test sample 80 is moved by the conveyor to the working station and brought by the changer to the counting station.

c. The scintillations in window $^{14}C$ are counted for a predetermined time and stored in the memory of the computer. The data provided by the analyzer 40 and A-D converter 42 at the end of the predetermined time are processed by the computer which determines the value $r_{80}$ for the test sample 80. A first step in the computation of E consists in selecting those stored values of $r$ and E which will be used for determining the counting efficiency $E_{80}$ for test sample 80. The program may be as indicated in FIG. 7, where the conventional representations used in the computing art have been used; the program is based on the assumption that $r_1 < r_2 < \ldots < r_N$: $r_{80}$ is first compared to $r_1$ to make sure that $r_{80} \geq r_1$ (if not, the test sample should be rejected since interpolation is not possible); $r_{80}$ is then compared to the successive values $r_2, r_3, \ldots r_N$ and should be smaller than $r_N$. If it is found that $r_{80}$ is greater than $r_i$ and smaller than $r_{i+1}$, the value $E_{80}$ will be determined by the Lagrange formula, using $r_i, r_{i-1}, r_{i+1}$ and $E_i, E_{i-1}, E_{i+1}$ as references: the value of $E_{80}$ is then used for correcting the count and computing the activity which is presented as dpm by the teletype.

d. Operations b) and c) are repeated on each test sample.

Figure 8:
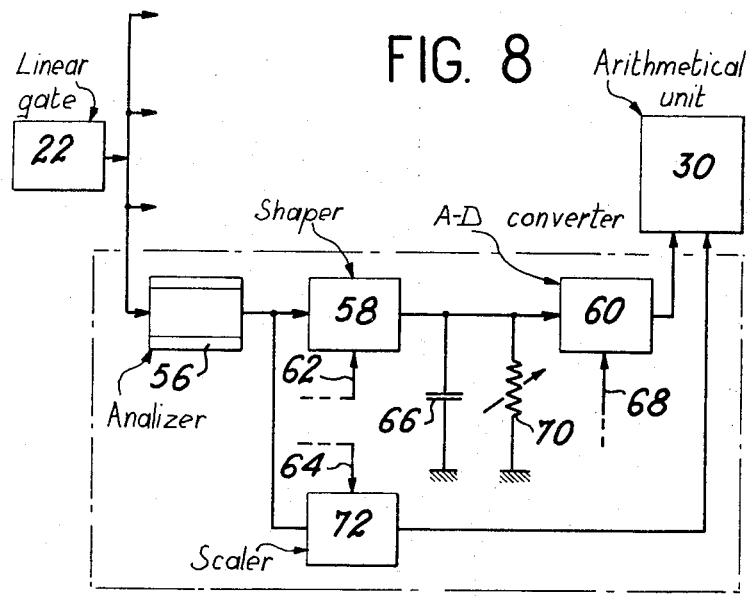
FIG. 8 is a simplified block diagram which represents the calibration assembly of a spectrometer in accordance with a modified embodiment of the invention.

As has been stated in the foregoing, it is possible to employ calibration assemblies of a type other than that which is illustrated in FIG. 2. By way of example, FIG. 8 shows as assembly which operates partially on the principle of analog computation. The only components of the spectrometer proper which are illustrated in this figure are the linear gate 22 and the arithmetic unit 30 of the computer. A pulse height analyzer 56, which is similar to the analyzer 40 of FIG. 2, passes those pulses which have an amplitude which is within the window $L_1-L_{2a}$. Such pulses are applied to a shaping circuit 58, which converts them into square signals having a constant width and a height which is identical or proportional to that of the input pulse. The shaped signals charge a storage capacitor 66 which may be connected to an analog-to-digital converter 60. The output signal of the converter is transmitted to a scaler which feeds the computer 30 for division of the numerical values formed by the converter 30 for division of the numerical values formed by the converter 60 and stored in scaler 72.

Counting takes place over a predetermined period of time which is determined by application of suitable signals to the inputs 62 and 64 of shaper 58 and counter 72. The charges carried by the square signals are stored in the storage capacitor 66; at the end of the counting time period, the signals representing the end of the counting pre-time is applied to the input 68 of the converter 60 which is triggered and delivers to the computer 30 a numerical signal representing the numerator of the formula (2). The resistor 70 is adjusted for an adjustable leakage current to reduce the charges stored by the capacitor 66 in an amount which compensate for the contribution of the background noise.

The two embodiments which have been described are adapted to determine the amplitude corresponding to the centroid in a single window which can be adjustable but which is the same for all the test samples. Calibrating assemblies of this type can be employed each time all the samples to be treated contain one high or medium energy radioisotope (carbon-14, for example) which can be either alone or accompanied by a second radioisotope of lower energy (such as tritium, for example).

On the contrary, when the spectrometer is intended to analyze a plurality of samples some of which are double labelled (with tritium and carbon-14, for example) whilst others are labelled solely with the radioisotope of lower energy (such as tritium) or only have a very low activity in the isotope which has the higher energy it is preferable to provide a spectrometer which has in addition to the standardization assembly which is illustrated in FIG. 2 a supplementary assembly which may be identical with the first (comprising the selector 40, converter 42, linear gate 44 and elements 46 and 48 for taking the background noise into account). The pulse height analyzer of the supplementary assembly is set so as to correspond to a different window (for example to the window $3_H$ of FIG. 1 in the case of a group of test samples, some of which are labelled with $^{14}C$, some of which are double-labelled with $^{14}C$ and $^3H$ whilst others are labelled only with tritium). In that case, the device also comprise an automatic selection assembly which essentially comprises a precount logic circuit and decides on completion of counting whether the centroid in the tritium window or the centroid in the carbon-14 window must be computed and employed as quenching correlation parameter. Whenever the count rate in the window $14_C$ is of a high order, the centroid in this window will evidently be employed since as long as it is not negligible a correction must be carried out in order to determine the amplitude of the centroid for tritium in the tritium window.

It will be readily apparent that the invention is not limited to the arrangements which have been described by way of example with reference to the accompanying drawings but extends on the contrary to all modifications which are apparent to those skilled in the art.

I claim:

1. A method of determination of quantitative indications of the degree of quenching occuring in a liquid scintillation sample having at least a radioactive isotope whose decay events are to be counted, comprising determining the amplitude of the centroid of that portion of the curve illustrating the net count rate versus the amplitude of the liquid scintillations in said sample in a predetermined amplitude range, said amplitude being indicative of the degree of quenching.

2. A method according to claim 1, wherein said sample has a plurality of radioactive isotopes, wherein said predetermined amplitude range is so selected as to include decay events of the most energetic of said radioisotopes only.

3. A method according to claim 1, of producing quantitative indications of the degree of quenching occuring in $n$ samples each having one at least of two radioactive isotopes having different energy spectra, comprising the steps of: separately determining the decay event rate due to each of said samples in a first predetermined amplitude range including contribution by the more energetic of the two radioisotopes only and in a second predetermined amplitude range encompassing the major portion at least of the decay events due to the less energetic of the two radioisotopes, separately accumulating the amplitudes of the decay events counted in said first and second predetermined amplitude ranges, and dividing the result of the accumulation by the count rate for that of the energy spectra which provides the more accurate determination of the amplitude corresponding to the centroid.

4. In liquid scintillation spectrometry, a method of determination of the activity of a radioisotope or radioisotopes contained in test samples, comprising the steps of : determining in the case of a number N of reference samples having known amounts of activity the counting efficiency E of said radioisotope or radioisotopes and the value of a quench correlation parameter $r$, determining for each test sample the value of the correlation parameter $r$, deducing the value of the corresponding value of the efficiency E for said radioisotope or radioisotopes contained in the test sample under analysis, and correcting the net counting rate obtained for the test radioisotope by utilizing the value of E as thus determined, wherein the improvement consists in using as correlation parameter $r$ the amplitude which corresponds to the centroid of a predetermined part at least of the amplitude of the light pulses delivered by said radioisotope or by the higher-energy of said radioisotope in said test samples.

5. A method according to claim 4, wherein one operating parameter of the spectrometer at least is adjusted in response to the value of $r$ and the same sample is counted with the adjusted parameter for the activity with a precisely known value of the counting efficiency 6. A method according to claim 4, including the preliminary step of measuring and storing the values $r_1$, $r_2$, ... $r_N$ and $E_1$, $E_2$, ... $E_N$ of $r$ and E, respectively, for a set of N reference sample each having a known activity of said radioisotope, wherein the value of E for each test sample is automatically computed after the value of $r$ for said test sample has been determined by interpolating between $n$ sets of stored values ($n$ being a predetermined integer higher than 1 and lower than N) corresponding to stored values of $r$ which are some of them larger than and the other smaller than the value of $r$ for said test sample.

7. A method according to claim 6, wherein the sets of values $r$ and E for the reference samples are analyzed immediately before the test samples are analyzed, said reference samples are arranged in a sequence corresponding to continuous increase or decrease of the degree of quenching and the value of $r$ for each sample is compared to the successive stored values of $r$ for selection of said $n$ sets of values.

8. In a liquid scintillation spectrometer wherein an external source of penetrating radiation is adapted to be positioned in operative relation with a test sample containing a beta emitting radioisotope within a liquid scintillation medium, a method of determination of the degree of quenching in said sample, comprising determining the amplitude corresponding to the centroid of that part of the curve plotting the net count rate of pulses due to Compton interactions within the sample and delivered by a transducer system delivering pulses having amplitudes in direct relation with the energies of the scintillations in the sample, vs the amplitudes of said pulses in a predetermined amplitude range, and comparing said amplitude of the centroid with a calibration curve correlating said amplitude of the centroid and the degree of quenching for said radioisotope.

9. In a scintillation spectrometer, a device for determination of the degree of quenching comprising, in combination : detection means for producing output electrical pulses having heights in relation to the energies of the scintillations in a test sample, pulse height analyzing means receiving said pulses and transmitting those of said pulses which are in a predetermined energy channel, counting means for providing a count of said last-named pulses, means for summing the amplitudes of said last-named pulses, means for subtracting background contribution from the count and sum, and means for determining the ratio of the net sum to the net count, said ratio being indicative of the degree of quenching.

10. A scintillation spectrometer for analyzing test samples each having a transparent vial containing at least one beta emitting isotope in operative relation with a scintillator in a liquid medium, comprising means for bringing successively a plurality of samples to a counting station and a transducer assembly providing electric pulses whose height is in direct relation with the intensity of scintillations in the test sample which is placed at said station, wherein said device comprises means for determining the pulse height which corresponds to the centroid of the amplitude spectrum of the pulses within a predetermined pulse height window and due to one radioisotope in the liquid sample.

11. A spectrometer according to claim 10 for counting double-labelled test samples, wherein said device determines the centroid of that portion of the spectrum of the higher energy isotope which is located within an amplitude window in which the lower energy isotope provides no contribution to the counting.

12. A spectrometer according to claim 11, wherein said portion of the spectrum is the portion located within the window in which normal counting of the higher energy isotope is performed.

13. A spectrometer according to claim 10 for analyzing mixed samples some of which are labelled with two radioisotopes and others of which with only one of said two radioisotopes, wherein said means for determination of the amplitude of the centroid comprise two assemblies which take separate measurements of the data required for determination of the amplitude correspond to the centroids in two separate energy windows each corresponding to one of said two radioisotopes.

14. A spectrometer according to claim 13, wherein said device comprises means for automatic selection of the one of the two windows which affords the highest degree of accuracy for determination of the height of the centroid of the corresponding radioisotope.

15. A spectrometer according to claim 9, comprising means for modifying automatically at least one of the operating parameters thereof in order to bring back the counting efficiency of each of the test samples to a predetermined value.

16. A spectrometer according to claim 9, wherein the transducer assembly comprises logarithmic amplification means.

17. A spectrometer according to claim 9, wherein the means for determination of the height corresponding to the centroid comprise a pulse height analyzer for passing pulses whose height is in said portion of the spectrum both to a counting channel having a counter for recording pulses and to another channel provided with an analog-to-digital converter and a counter and means for dividing the result supplied from the second channel by the result supplied from the first channel.

18. A spectrometer according to claim 9, wherein said device comprises correction means for correcting background noise, having an element for displaying the background contribution to the count rate and an element for displaying the mean background level, said division means being intended first to correct the contents of the counters as a function of the displayed data and then to perform the division.

19. A spectrometer according to claim 10, wherein the means for determination of the pulse height corresponding to the centroid comprise : a pulse height analyzer which delimits said portion of the spectrum and passes pulses to a first channel which has a counter for recording pulses transmitted during a predetermined time interval and to a second channel which has a shaping circuit for giving a constant duration to all pulses, a capacitor for storing the charges carried by the shaped pulses, an analog-to-digital converter and means for triggering the D-A converter at the end of said predetermined time interval; and means for dividing the output of said D-A converter by the count registered by the counter.

20. A spectrometer according to claim 19, having background correction means which comprise an adjustable resistor connected in parallel with the storage capacitor.

* * * * *

UNITED STATES PATENT OFFICE
CERTIFICATE OF CORRECTION

Patent No. 3,715,584        Dated February 6, 1973

Inventor(s) EMMANUEL ROSENSTINGL

It is certified that error appears in the above-identified patent and that said Letters Patent are hereby corrected as shown below:

Column 3, line 12, "U.S. Thomas" should be deleted.

Column 8, line 31, "Ser. No. 788,057" should be changed to read --Ser. No. 778,057--.

Column 8, line 41, "$L_1-L_{2a}$" should be changed to read --$L_1-L_2$--.

Column 9, line 35, "as" should be changed to read --an--.

Column 9, line 42, "$L_1-L_{2a}$" should be changed to read --$L_1-L_2$--.

Column 9, line 49, the reference number "72" should be inserted after the word "scaler".

Column 9, lines 49 and 50, "for division of the numerical valu formed by the converter 30" should be deleted.

Signed and sealed this 17th day of December 1974.

(SEAL)
Attest:

McCOY M. GIBSON JR.
Attesting Officer

C. MARSHALL DANN
Commissioner of Patents